UNITED STATES PATENT OFFICE.

GILBERT JOHN FOWLER AND GLADYS MUMFORD, OF MANCHESTER, ENGLAND.

IMPROVED FERTILIZER.

1,294,080. Specification of Letters Patent. Patented Feb. 11, 1919.

No Drawing. Application filed June 1, 1916. Serial No. 101,120.

*To all whom it may concern:*

Be it known that we, GILBERT JOHN FOWLER and GLADYS MUMFORD, subjects of the King of England, residing at Rusholme, Manchester, in the county of Lancaster, United Kingdom of Great Britain, and Chorlton on Medlock, Manchester, in the county of Lancaster, United Kingdom of Great Britain, respectively, have invented an Improved Fertilizer, of which the following is a specification.

This invention has reference to fertilizers, being the sludge or solid matters separated from sewage or analogous liquids, in sewage purifying and analogous processes; and the chief object and effect of the invention is to provide a fertilizer of manure of this species, containing a relatively high percentage of nitrogen valuable for plant food, and also organisms in a state of activity, serviceable in land cultivation to the production of a high yield of grown crops.

With regard to the process of oxidizing sewage or like matter through the agency of bacteria, sewage is introduced into a tank or container in the presence of a relatively large proportion of sludge containing aerobic bacteria, which has been produced by passing air through sewage in the presence of such sludge containing the bacteria; and this mixture of fresh sewage and bacterial sludge has air passed through it, preferably in the form of very fine air globules, and it is circulated in the tank so that the sludge and bacteria are always being distributed and also being refreshed with air; and then the sludge is settled out from the sewage by rendering the liquid quiescent, and such sludge constitutes the sludge herein referred to. But to continuously produce this fertilizer, the bacterial sludge necessary for breaking down and purifying fresh sewage (and thus producing more bacterial sludge), only that quantity of the sludge so separated must be taken for the manufacture of the fertilizer hereunder, which is over and above the quantity necessary for use over again in the process.

By the addition and admixture of this fresh active residue or sludge to the prepared residue or sludge, the whole is revivified, and rendered an active bacterial fertilizer.

In the first place, the fertilizer produced in the manner described, by the oxidation of sewage matter (or like liquid) will contain a maximum quantity of nitrogen obtainable which is available for plant food; secondly, the fertilizer will contain no, or few, germs, molds, seeds, or spores; and it will contain as stated, organisms in a state of activity, and which are influential in the obtainment of a high yield of crops from the land treated with the fertilizer.

The nitrogen content of the fertilizer will or may be as much as 6% and perhaps more; and it is non-colloidal and non-greasy in character.

The process of the oxidation of sewage or like matters by air through the agency of bacteria is now well known, and requires no explanation.

In the artificial drying and heating of the sludge or residue, it is advantageous to heat the sludge or substance to a temperature not higher than that of the boiling point of water; but if desired, in special cases, the heating may be carried to a higher temperature.

A suitable proportion of fresh or active sludge, produced in the manner above referred to, to be added to and mixed with the prepared material, will be about from 5% to 10% by bulk.

According to a modification, the improved fertilizer consisting of the active bacterial sludge, free from molds, seeds and the like is produced by partially sterilizing the bacterial sludge or residual matter of the kind referred to, by heating it to a temperature less than that above described, say to about 60° to 70° C. The material is subjected to this temperature for a relatively long period, say from 12 to 48 hours, the effect of which is that, while the molds, seeds, etc., are killed, sufficient bacteria of the kind required, and herein referred to, and spores, will be left to revivify the fertilizer, and render it bacterially active in a short time. This treatment produces a complete fertilizer.

Whereas, none of the forms of sewage sludge generally produced are of much value as manure owing to the low percentage of nitrogen content, the difficulty of handling, their greasy and colloidal nature, and other causes, this sludge fertilizer, on the other hand, has a very high nitrogen content, is of such character, and is in such a condition, that it will incorporate or enter into union with the soil in such a manner as to act highly effectively in it, in all ways; and it is free or practically free of molds, seeds and germs, and non-colloidal. It constitutes a species of "humus", which is granular in character, and very readily dried and handled.

The fertilizer under this invention has been described as that being the solid residue or sludge resulting from the oxidation of sewage matter or any similar matter through the agency of bacteria, by forcing air through the liquid in the presence of the bacteria. While this is the preferred form of it, it may in some cases, be the solid residue or sludge resulting from other sewage or like liquid or liquefied matter purifying processes, heated and dried artificially as described, and revivified and rendered an active bacterial fertilizer by the addition of a small quantity of fresh active residue or sludge, produced by the oxidation of sewage matter through the agency of bacteria, by forcing air through the sewage, as above referred to.

What is claimed is:—

1. The herein-described fertilizer made by rendering sewage or the like bacterially active, sterilizing and drying the sludge so produced, and inoculating the material with a portion of fresh active sludge.

2. The herein-described fertilizer made by rendering sewage or the like bacterially active by forcing air through such sewage or the like, heating the sludge so produced to sterilize and dry it, and inoculating the resultant material with a portion of the bacterially-active sludge.

3. The herein-described fertilizer made by forcing air through sewage or the like in the presence of bacteria thereby forming an active sludge, heating the sludge to sterilize and dry it and inoculating the solid thus produced with a portion of fresh active sludge to revivify and render it bacterially active.

4. The herein described improved sewage sludge fertilizer, consisting of bacterially active non-colloidal dry sewage sludge.

5. The herein described improved sewage sludge fertilizer, consisting of bacterially active dry sewage sludge, rich in nitrogen in a state available for plant food.

6. The herein described improved sewage sludge fertilizer, consisting of bacterially active dry sewage sludge of granular character.

7. A fertilizer made by producing a bacterially active sludge from sewage or the like, sterilizing the same, and revivifying the sterilized product through inoculation with a portion of bacterially-active sludge.

In testimony whereof we have signed our names to this specification in the presence of two subscribing witnesses.

GILBERT JOHN FOWLER.
GLADYS MUMFORD.

Witnesses for Gilbert John Fowler:
  S. J. EARL,
  CHAS. J. FALCONER.
Witnesses for Gladys Mumford:
  SOMERVILLE GOODALL,
  PERCY HUBBARD.